(12) United States Patent
Barrera

(10) Patent No.: US 6,564,832 B2
(45) Date of Patent: May 20, 2003

(54) FORMATION OF A MULTI-LOBED ELECTRICAL WINDING

(75) Inventor: Giorgio Barrera, Turin (IT)

(73) Assignee: Polytool S.r.l., Turin (IT)

( * ) Notice: Subject to any disclaimer, the term of this patent is extended or adjusted under 35 U.S.C. 154(b) by 0 days.

(21) Appl. No.: 10/015,933

(22) Filed: Dec. 11, 2001

(65) Prior Publication Data

US 2002/0179172 A1 Dec. 5, 2002

Related U.S. Application Data

(63) Continuation of application No. 09/761,540, filed on Jan. 16, 2001, now abandoned, which is a continuation of application No. 09/443,941, filed on Nov. 19, 1999, now Pat. No. 6,196,273, which is a continuation of application No. 09/204,869, filed on Dec. 3, 1998, now Pat. No. 6,019,141, which is a continuation of application No. 08/970,480, filed on Nov. 14, 1997, now Pat. No. 5,881,778.

(30) Foreign Application Priority Data

Mar. 18, 1997 (IT) ............................ TO97A0220
Apr. 30, 1997 (IT) ............................ TO97A0376

(51) Int. Cl.$^7$ ................................................. B21F 3/00
(52) U.S. Cl. ....................................................... 140/92.2
(58) Field of Search .............................. 140/92.1, 92.2; 29/734, 736, 732

(56) References Cited

U.S. PATENT DOCUMENTS

| | | |
|---|---|---|
| 4,217,938 A | 8/1980 | Barrett et al. |
| 4,351,102 A | 9/1982 | Grozinger et al. |
| 4,399,843 A | 8/1983 | Sedgewick |
| 4,402,129 A | 9/1983 | Kreuzer et al. |
| 4,512,376 A | 4/1985 | Barrera |
| 4,680,857 A | 7/1987 | Lintott |
| 4,847,982 A | 7/1989 | Morrill |
| 4,857,787 A | 8/1989 | Taji et al. |
| 5,197,180 A | 3/1993 | Mihalko |
| 5,372,165 A | 12/1994 | Leame |
| 5,406,987 A | 4/1995 | Gassner et al. |
| 5,492,154 A | 2/1996 | Napierski |
| 5,709,251 A | 1/1998 | Leame |

FOREIGN PATENT DOCUMENTS

GB    2 160 797    1/1986

OTHER PUBLICATIONS

Nov. 16, 1999 letter on behalf of assignee to Advanced Machine & Tool Corporation.
Mar. 27, 2000 letter on behalf of Advanced Machine & Tool Corporation to a representative of assignee.
Apr. 18, 2000 letter on behalf of assignee to a representative of Advance Machine & Tool Corporation.
Apr. 19, 2000 letter on behalf of Advanced Machine & Tool Corporation to a representative of assignee.
May 8, 2000 letter on behalf of Advanced Machine & Tool Corporation to a representative of assignee.
May 17, 2000 letter on behalf of Advanced Machine & Tool Corporation to a representative of assignee.
May 23, 2000 letter on behalf of assignee to a representative of Advance Machine & Tool Corporation.
Jun. 1, 2000 letter on behalf of Advanced Machine & Tool Corporation to a representative of assignee, enclosing an unnumbered set of documents.

(List continued on next page.)

*Primary Examiner*—Lowell A. Larson
(74) *Attorney, Agent, or Firm*—Fish & Neave; Garry J. Tuma

(57) ABSTRACT

Methods and apparatus are provided for forming a multi-lobed winding for the stator of an alternator, particularly those for use in the automotive field and of the type comprising turns defining a star-shaped configuration having a plurality of radial lobes alternated with hollows.

33 Claims, 8 Drawing Sheets

OTHER PUBLICATIONS

Jun. 5, 2000 letter on behalf of assignee to a representative of Advanced Machine & Tool Corporation, enclosing a set of the Jun. 1, 2000 documents marked with numbers applied by a representative of assignee.

Jul. 11, 2000 letter on behalf of Advanced Machine & Tool Corporation to assignee.

Jul. 14, 2000 letter on behalf of assignee to Advanced Machine & Tool Corporation.

Jul. 19, 2000 letter on behalf of Advanced Machine & Tool Corporation from a representative of Advanced Machine & Tool Corporation to another representative of Advanced Machine & Tool Corporation.

Jul. 28, 2000 letter on behalf of assignee to a representative of Advance Machine & Tool Corporation.

Aug. 23, 2000 letter on behalf of assignee to a representative of Advance Machine & Tool Corporation.

May 18, 2001 letter on behalf of Advanced Machine & Tool Corporation to a representative of assignee, enclosing a May 3, 2001 uncross–examined declaration of Larry Maddox.

Jun. 14, 2001 letter on behalf of Advanced Machine & Tool Corporation to a representative of assignee.

Jun. 19, 2001 letter on behalf of assignee to a representative of Advance Machine & Tool Corporation.

Jun. 20, 2001 letter on behalf of Advanced Machine & Tool Corporation to a representative of assignee.

Jun. 22, 2001 letter on behalf of assignee to a representative of Advance Machine & Tool Corporation.

Miscellaneous documents received with Advanced Machine & Tool Corporation's Jun. 1, 2000 letter and marked "AMT 000001–75" by a representative of assignee.

Unsworn and undated statement by Don Kammeyer, Marketing Manager at Advanced Machine & Tool Corporation, received with Advanced Machine & Tool Corporation's Jun. 1, 2000 letter and marked "AMT 000076–77" by a representative of assignee.

Unauthenticated, alleged notebook pages, plus unauthenticated typewritten material received with Advanced Machine & Tool Corporation's Jun. 1, 2000 letter and marked "AMT 000078–86" by a representative of assignee.

Uncross–examined Declaration Of Larry Maddox, dated May 3, 2001, received with Advanced Machine & Tool Corporation's May 18, 2001 letter.

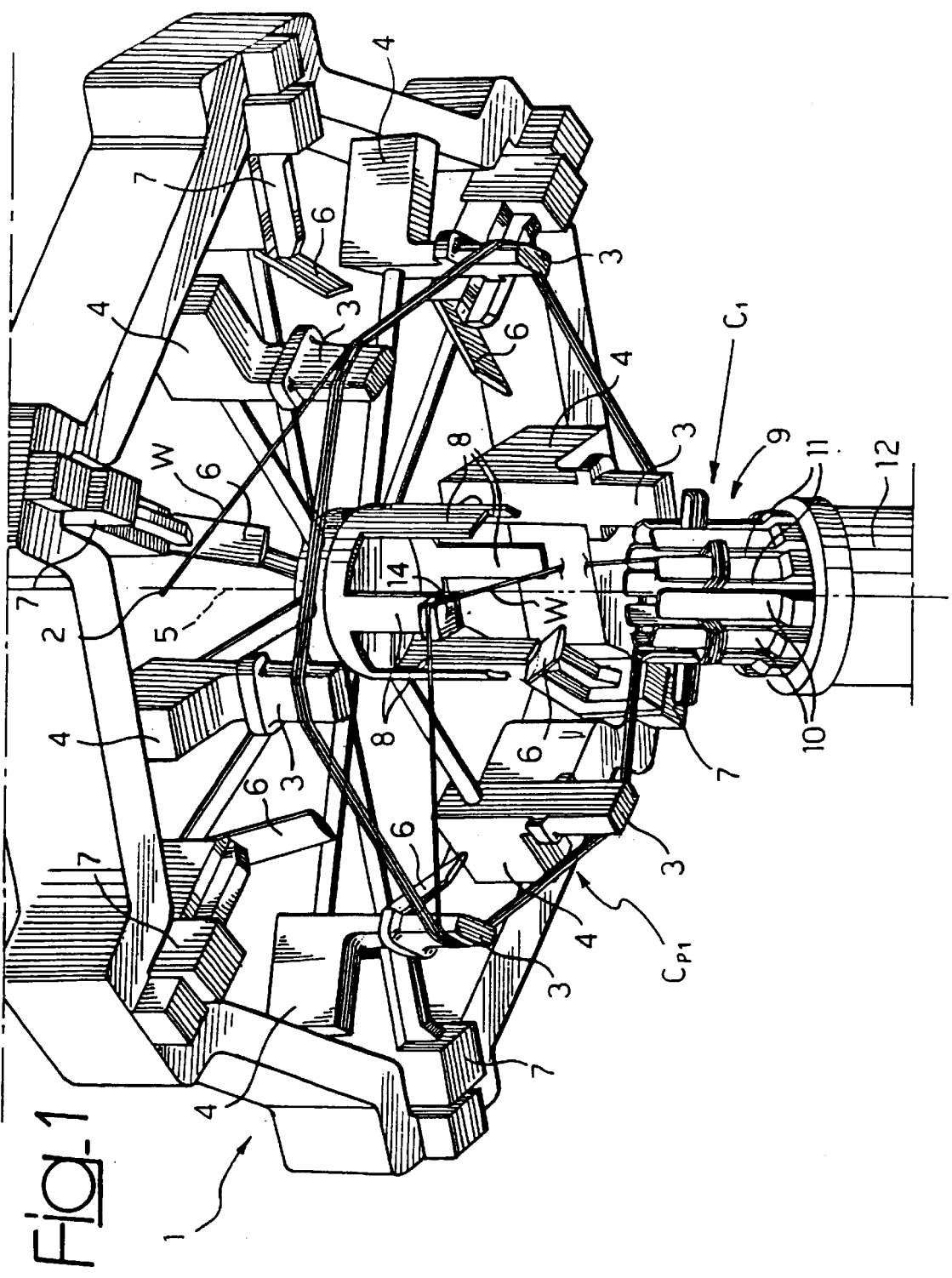

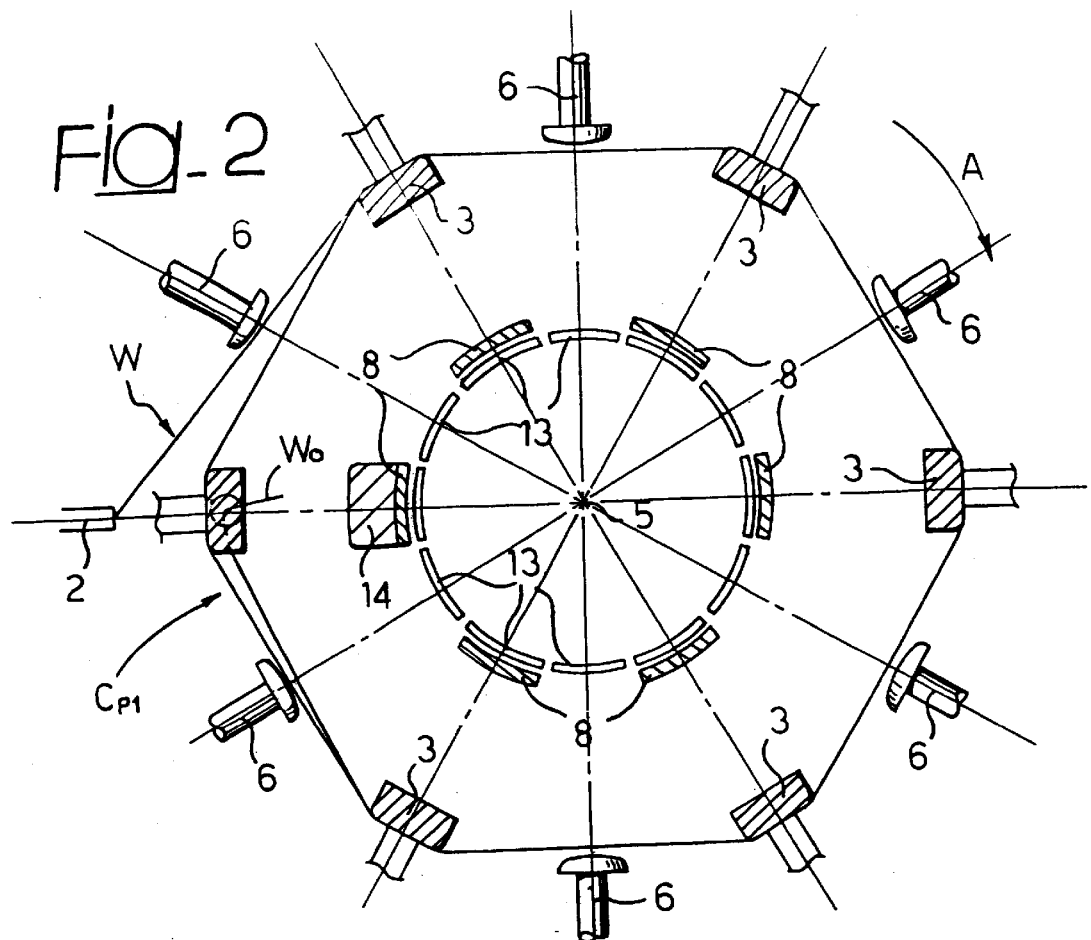
Fig_2
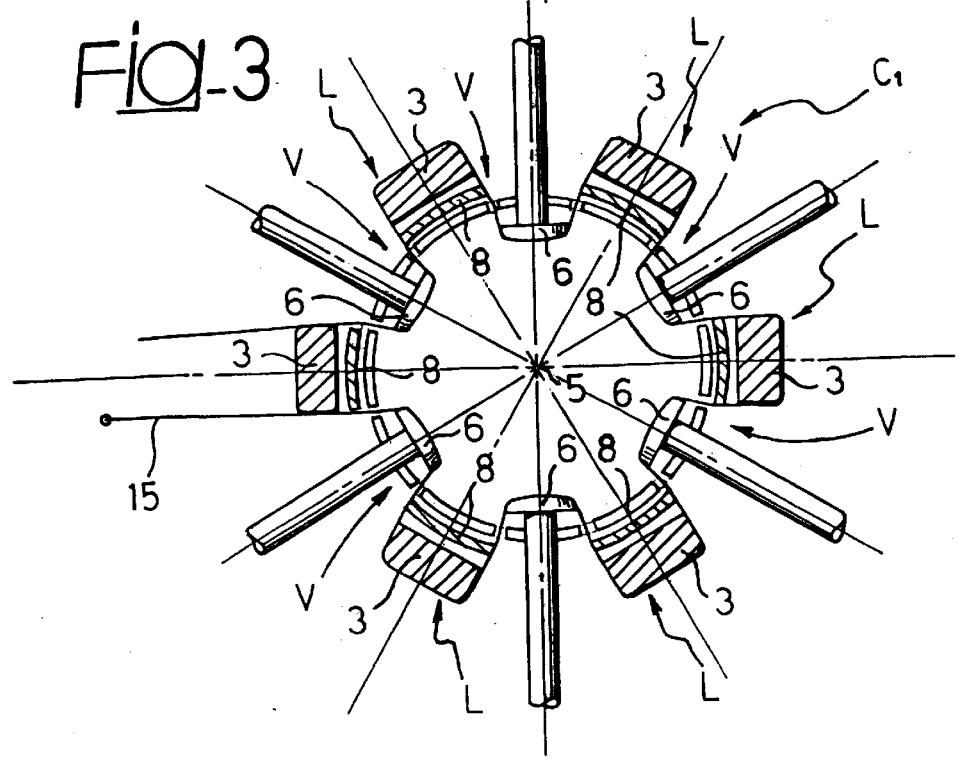
Fig_3

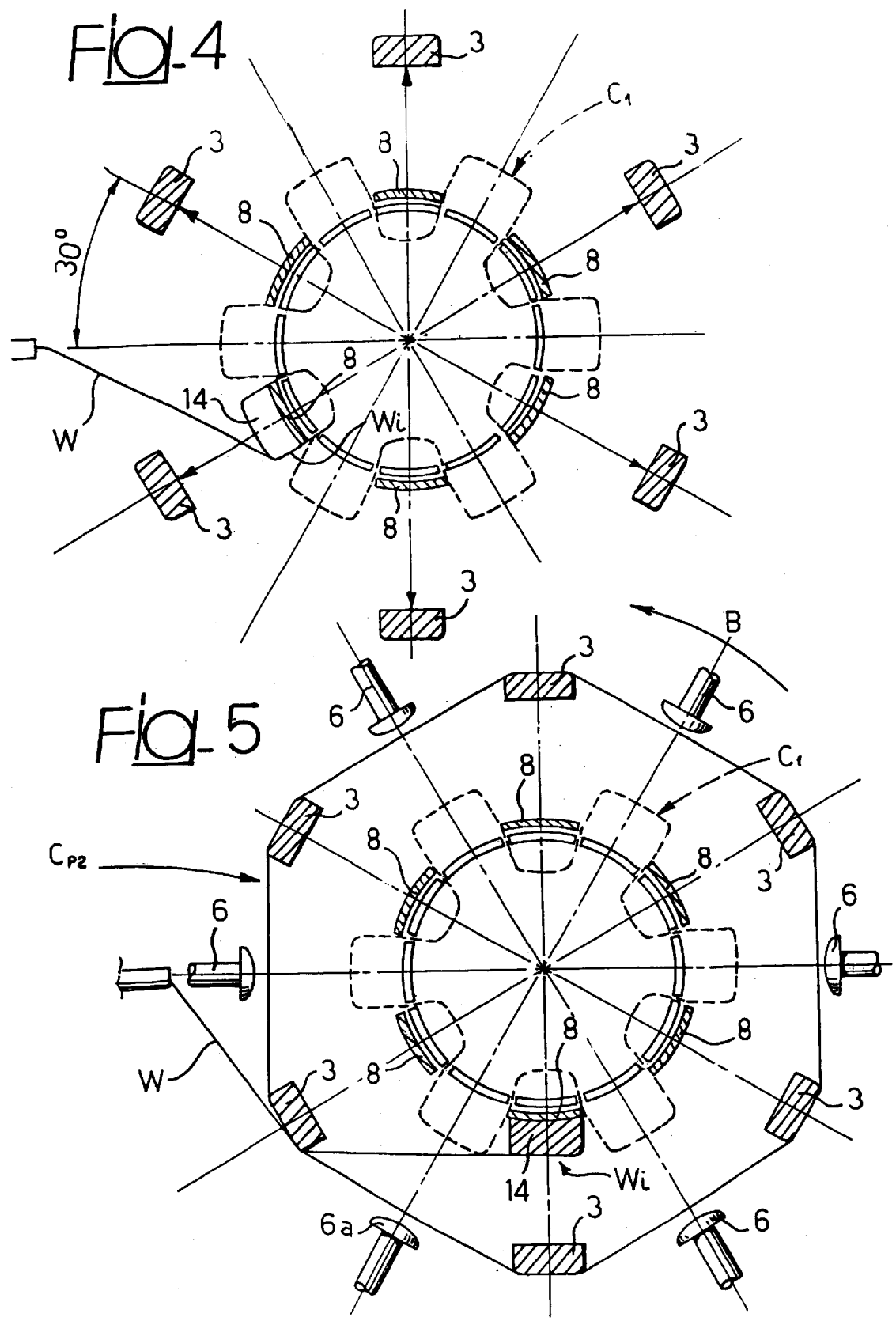

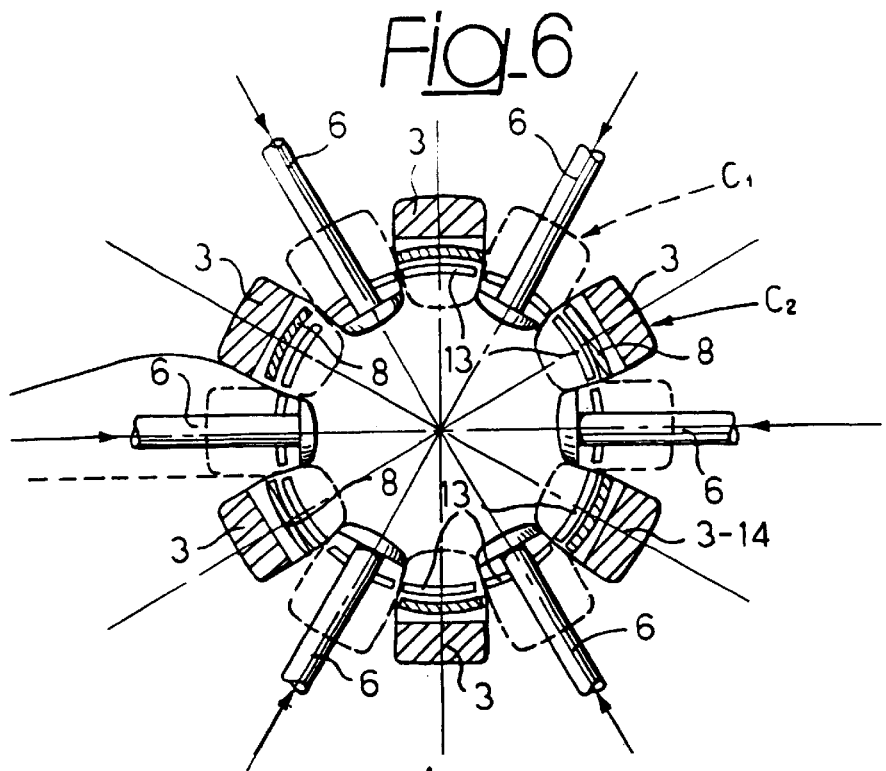
Fig_6
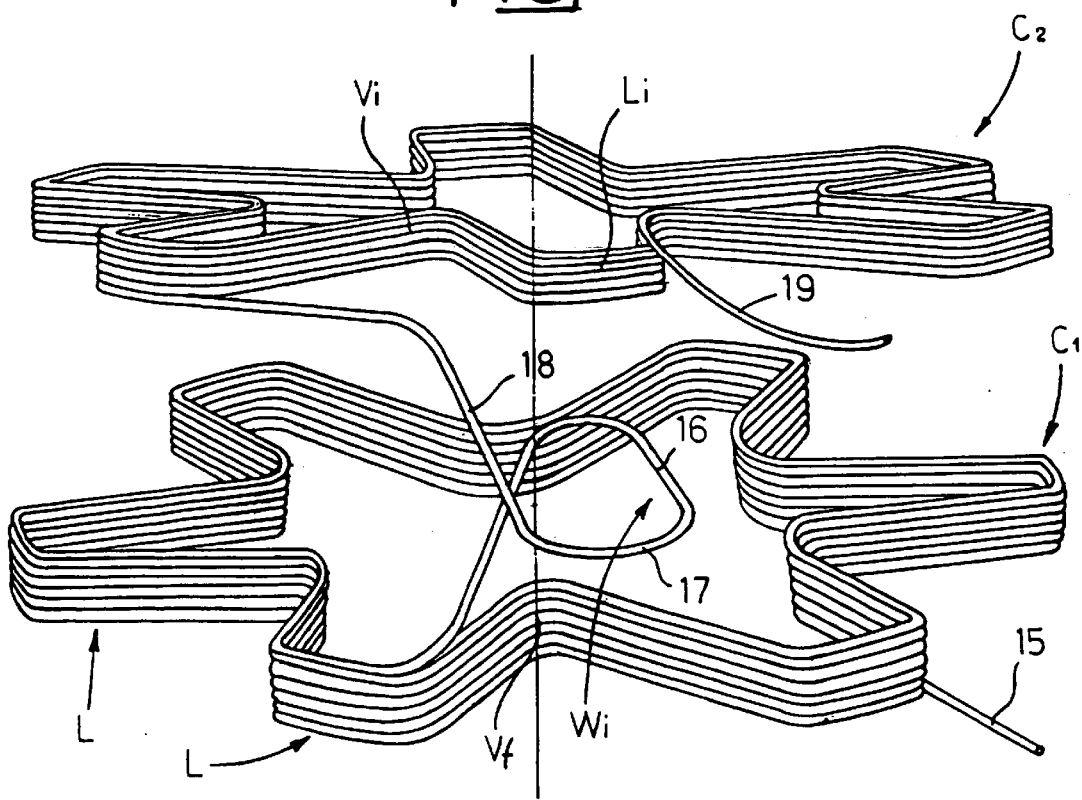
Fig_7

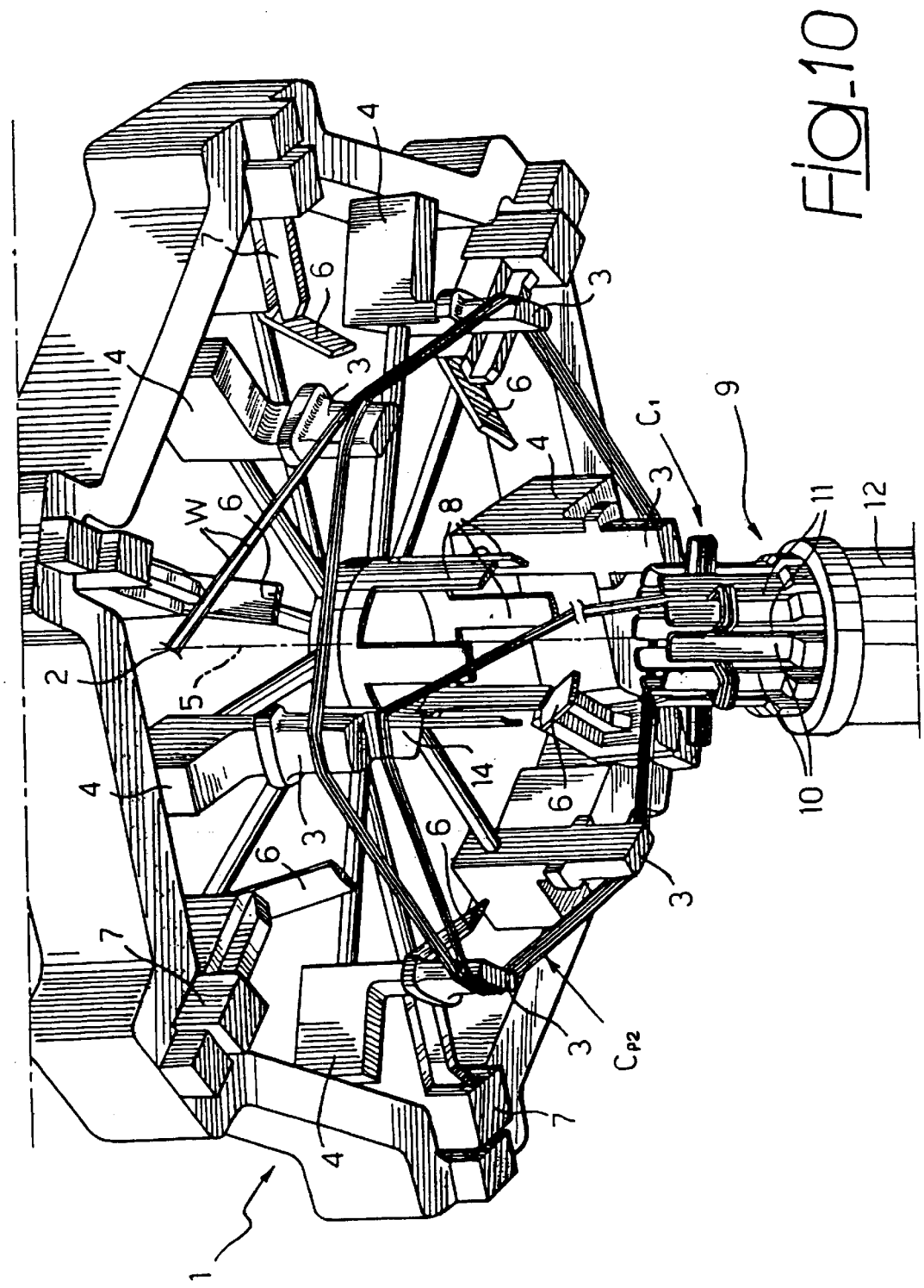

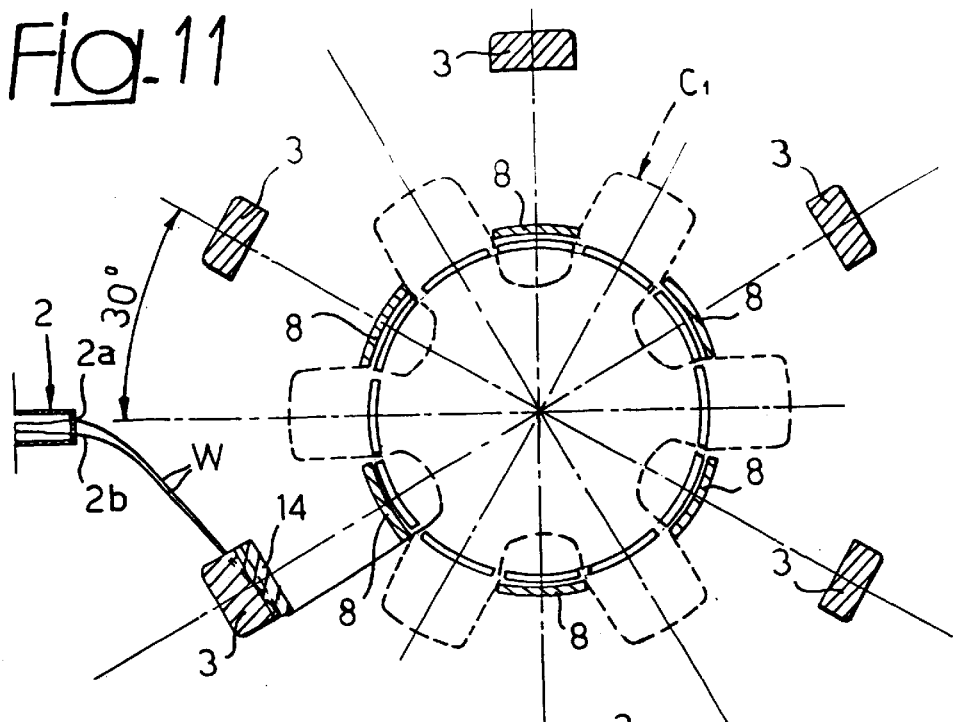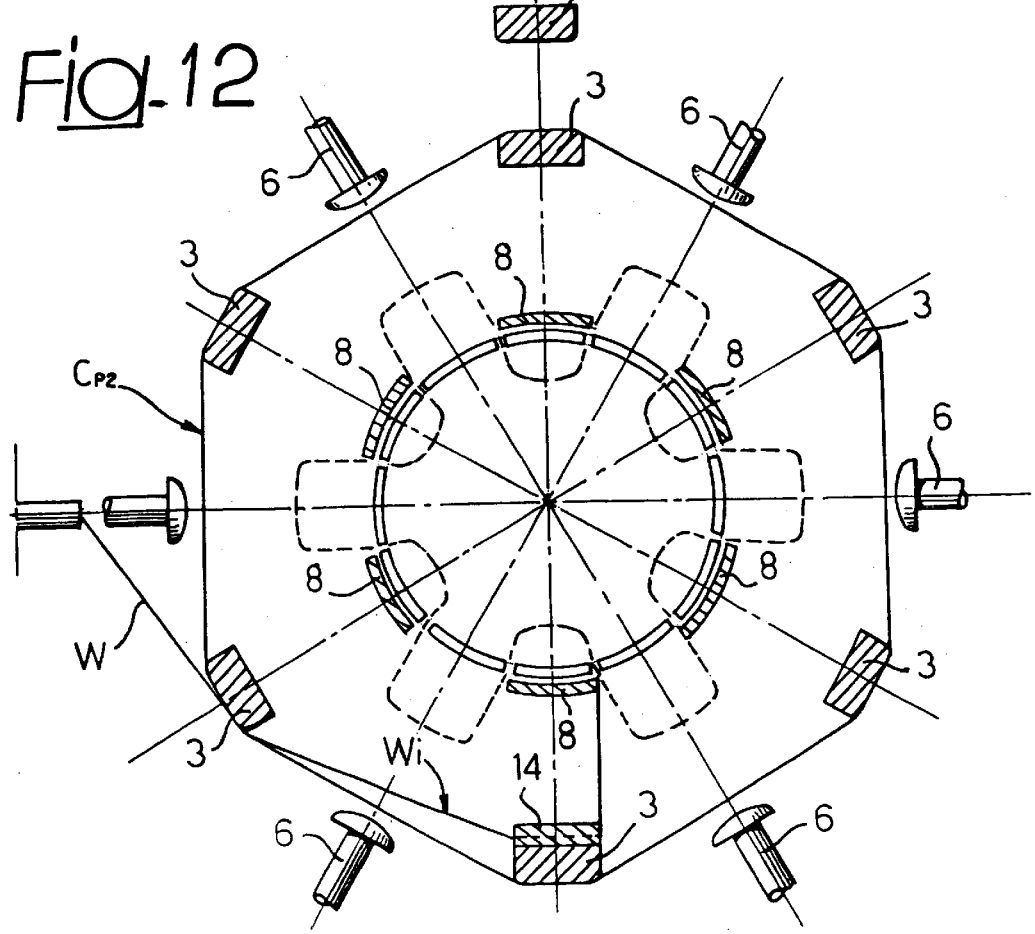

Fig_13
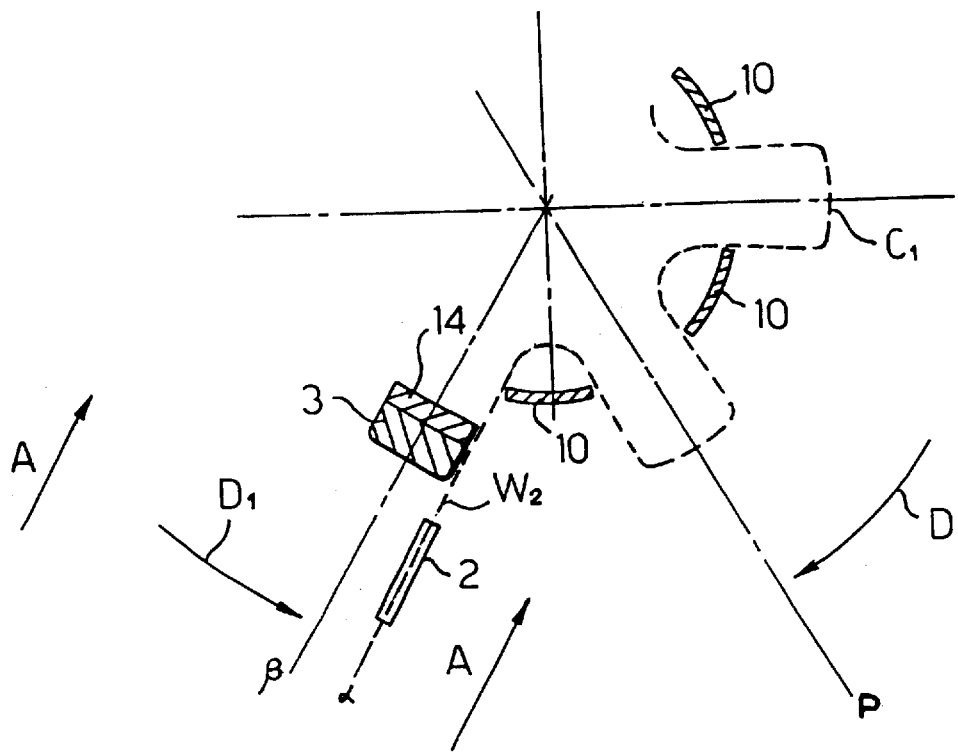
Fig_14
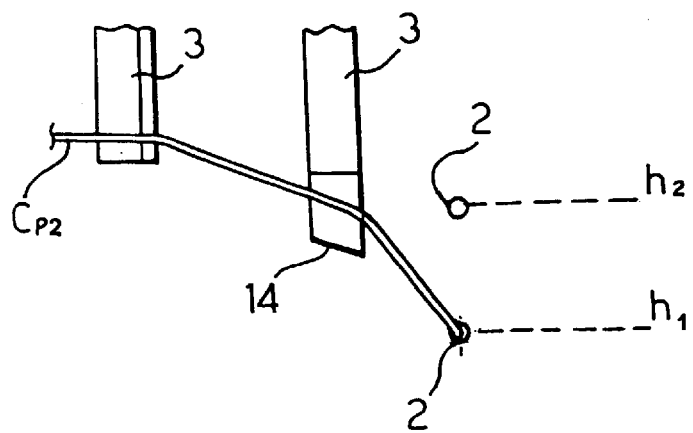

FORMATION OF A MULTI-LOBED ELECTRICAL WINDING

CROSS REFERENCE TO RELATED APPLICATIONS

This is a continuation of commonly assigned U.S. patent application Ser. No. 09/761,540, filed Jan. 16, 2001, now abandoned, which is a continuation of U.S. patent application Ser. No. 09/443,941, filed Nov. 19, 1999, now U.S. Pat. No. 6,196,273, which is a continuation of U.S. patent application Ser. No. 09/204,869, filed Dec. 3, 1998, now U.S. Pat. No. 6,019,141, which is itself a continuation of U.S. patent application Ser. No. 08/970,480, filed Nov. 14, 1997, now U.S. Pat. No. 5,881,778, all of which are hereby incorporated by reference in their entirety.

BACKGROUND OF THE INVENTION

The present invention relates to a multi-lobed electrical winding, such as those for the stator of an alternator, particularly for use in the automotive field and of the type comprising turns defining a star-shaped configuration having a plurality of radial lobes alternated with hollows.

Methods and apparatus for forming a multi-lobed winding for the stator of an alternator are disclosed, for example, in Italian Patent No. 1,157,040, which corresponds to Barrera U.S. Pat. No. 4,512,376, entitled Apparatus For Forming Stator Coils Of Dynamo Electric Machines. Both patents are incorporated herein by reference.

Typically, in the case of a three-phase alternator for automotive use, each stator is provided with a winding including three multi-lobed coils angularly shifted relative to each other. The coils are formed at different stages by a forming machine, and each coil has two wire terminal ends. Each of the three multi-lobed coils constituting one of the three phases of the winding is split into two semi-coils or semi-phases which are angularly shifted by one lobe relative to each other, so that the lobes of one semi-phase are opposite the hollows between the lobes of the other semi-phase.

As is known in the art, the two semi-phases of each coil are made by a forming machine at two subsequent stages by cutting the supplied wire between one forming stage and the other. Each semi-phase of the three winding phases of a finished winding inserted into a stator therefore has a pair of terminal ends. This results in a total of twelve terminal ends.

A stator winding of undulatory type with a single continuous wire, including two multi-lobed coils shifted relative to each other by one lobe, has already been proposed. (See, e.g., Taji et al. U.S. Pat. No. 4,857,787, entitled Armature Of A.C. Generator For A Car And Method Of Manufacturing The Same, and corresponding European Patent No. 209,091, both of which are incorporated herein by reference). This method initially involves forming a single multi-lobed coil which is then split into two coils, without cutting the wire portion connecting them, one of the coils being overlapped on the other in an overturned position. This additional operation wastes time and accordingly decreases the productivity of the machine.

In view of the foregoing, it would be desirable to provide a method and apparatus in which the final required configuration of the winding is obtained without additional operations after winding the wire by an apparatus which requires very small changes with respect, for example, to the apparatus taught in Italian Patent No. 1,157,040 and corresponding U.S. Pat. No. 4,512,376.

It would also be desirable to provide a method and apparatus for forming a multi-lobed winding for the stator of an alternator which enable the two semi-phases of each winding phase to be made continuously, without cutting the wire at the end of the forming operation of the first semi-phase, so as to simplify the operations necessary for forming the winding, as well as to obtain a finished winding with a low number of terminal ends.

It would further be desirable to provide a method and apparatus by which multi-lobed windings constituted by a plurality of coaxial superimposed multi-lobed coils having their lobes angularly shifted relative to each other can be obtained continuously.

SUMMARY OF THE INVENTION

It is an object of the present invention to provide a method and apparatus in which the final required configuration of the winding is obtained without additional operations after winding the wire by an apparatus which requires very small changes with respect, for example, to the apparatus taught in Italian Patent No. 1,157,040 and corresponding U.S. Pat. No. 4,512,376.

It is also an object of the present invention to provide a method and apparatus for forming a multi-lobed winding for the stator of an alternator which enable the two semi-phases of each winding phase to be made continuously, without cutting the wire at the end of the forming operation of the first semi-phase, so as to simplify the operations which are necessary for forming the winding as well as to obtain a finished winding with a low number of terminal ends.

It is further an object of the present invention to provide a method and apparatus by which multi-lobed windings constituted by a plurality of coaxial superimposed multi-lobed coils having their lobes angularly shifted relative to each other can be obtained continuously.

These and other objects and advantages of the invention are accomplished by forming a multi-lobed winding for the stator of an alternator. In a first stage, a first multi-lobed coil is formed by winding a continuously fed wire in a first direction. In a second stage, a second multi-lobed coil, axially superimposed to the first coil, is formed without cutting the wire being fed by winding the wire in the opposite direction and arranging the second coil at a position angularly shifted relative to the first coil. The second coil has its lobes at the same angular positions as the hollows of the first coil. The wire portion connecting the two coils is bent where the wire reverses its winding direction so as to form a loop, the loop following an annular path matching the profile of a lobe of one of the two coils for one part and the profile of a hollow of the other coil opposite the lobe for another part.

The invention thus provides a multi-lobed winding for the stator of an alternator, particularly for use in the automotive field and of the type comprising turns defining a star-shaped configuration having a plurality of radial lobes alternated with hollows.

The invention also provides a winding comprising two coaxial superimposed multi-lobed coils with lobes angularly shifted relative to each other. There is no interruption of the wire constituting the winding and, therefore, the winding has only two terminal ends. Thus, the method and apparatus according to the invention simplify the forming operation as well as provide a stator winding with a number of terminal ends reduced by a factor of two.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 1 is a perspective view from below of a rotating unit that forms part of a preferred embodiment of apparatus according to the invention, where the device for receiving the multi-lobed coils formed on the rotating unit is shown in a perspective view from above, the receiving device also functioning, according to a known technique, as a device for inserting (at a subsequent stage) the multi-lobed coils into the slots of a stator of an alternator;

FIGS. 2–6 are diagrammatic plan views of different forming stages of the multi-lobed winding according to the invention;

FIG. 7 is a perspective view of a multi-lobed coil comprising two semi-phases angularly shifted relative to each other, obtained according to the invention, which has been shown in a deformed condition in order to more clearly show the wire portion connecting the two semi-phases;

FIG. 10 is a perspective view from below of a rotating unit forming part of another preferred embodiment of apparatus according to the invention, where the device for receiving the multi-lobed coils formed on the rotating unit is also shown;

FIGS. 11 and 12 are diagrammatic plan views of the apparatus at two different stages of the forming operation of the multi-lobed winding according to the invention;

FIG. 13 is a partial diagrammatic plan view of the apparatus; and

FIG. 14 is a partial view of the apparatus of FIG. 13 along A—A at a different stage of the forming operation of the multi-lobed winding.

DETAILED DESCRIPTION OF THE INVENTION

Figure 8:
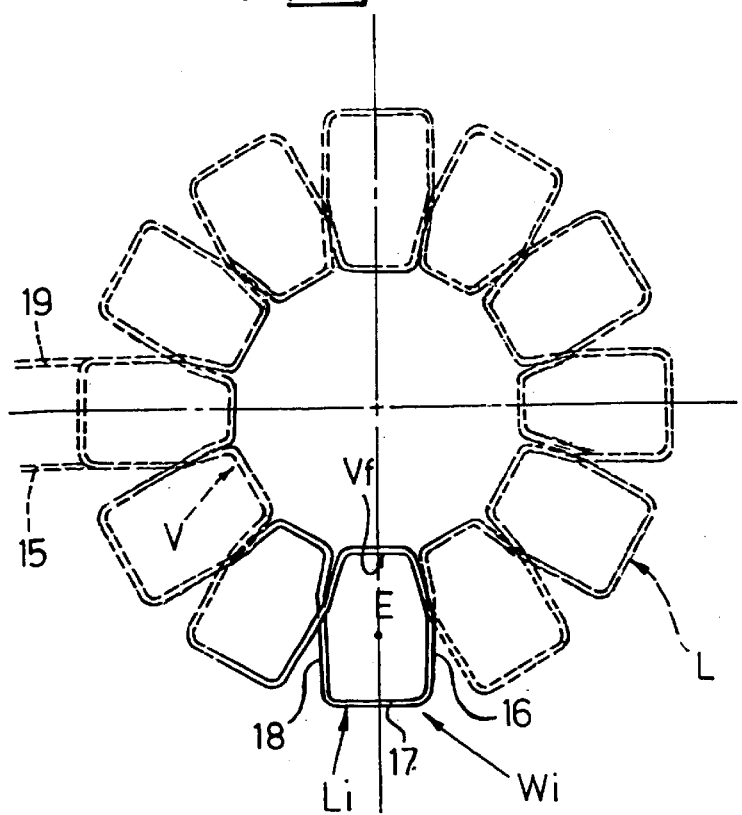
FIG. 8 is a plan view of the coil of FIG. 7.

FIG. 1 shows rotating unit 1 of a machine that forms multi-lobed coils which are to be inserted into the slots of a stator of a three-phase alternator preferably for automotive use. The machine comprising rotating unit 1 is of a general type described in, for example, Italian Patent No. 1,157,040 and corresponding U.S. Pat. No. 4,512,376. Therefore, a detailed description of the general structure of the machine is not repeated herein, since it is illustrated in the above-identified patents.

In a way similar to that known in the art, rotating unit 1 is used to wind thereon a wire W fed by a wire feeding device (not shown in FIG. 1) which has a delivery tube outlet mouth 2, as shown in FIG. 1.

Rotating unit 1 carries six forming elements 3 on which the wire fed from delivery tube outlet mouth 2 is wound as a result of the rotation of rotating unit 1, so as to form a hexagonal coil $C_{P1}$ (see also FIG. 2). One of forming elements 3 is provided with a clamp to hold the starting end $W_O$ of the wire.

Forming elements 3 are carried by slides 4, which are radially slidably mounted relative to rotational axis 5 of rotating unit 1. Forming elements 3 are positioned between a first radially outer end position (shown in FIGS. 1 and 2) and a second radially inner end position (shown in FIG. 3).

In a first stage of the forming method, forming elements 3 are at their outer positions (FIG. 2) so as to enable formation of, as already indicated, a hexagonal coil $C_{P1}$ having a relatively large diameter, as shown in FIG. 2.

The machine according to the invention has six pushing members 6 included on rotating unit 1 that are radially movable relative to rotational axis 5 to push radially inward the central parts of the sides of the hexagonal coil formed in the first stage of the method (FIG. 2). Pushing members 6 are carried by slides 7 (FIG. 1), which are slidably mounted on radial guides carried by rotating unit 1.

When hexagonal coil $C_{P1}$ has been formed with the required number of turns, rotating unit 1 is stopped and pushing members 6 are moved towards the radially inner position shown in FIG. 3, so as to engage the sides of the polygonal coils $C_{P1}$, transforming the latter into a multi-lobed or star-shaped coil $C_1$ (FIG. 3). During this operation, forming elements 3 also move radially inward while providing some resistance to the tension exerted by the wire of the coil as a result of the pressure applied by pushing members 6. As is known in the art, this resistance is obtained by connecting forming elements 3 by flexible metal cables to a fluid cylinder having a chamber which decreases in volume during the radial inward movement of forming elements 3 and which is connected to a discharge reservoir through a throttled passage. Since these details of construction are known from the above-mentioned patents, they are not repeated herein. However, any other device of known type adapted to provide the above-mentioned effect of controlled yielding of forming elements 3 may be alternatively used.

Referring to FIGS. 1–3, rotating unit 1 is also provided with a circumferential set of six flat fingers 8 which are at angular positions corresponding to forming elements 3. Fingers 8 are carried by rotating unit 1 and are in radially fixed positions relative thereto, in contrast to forming elements 3 and pushing members 6. As shown in FIGS. 2 and 3, fingers 8 are located at a radially inner position adjacent the innermost radial position of the respective forming elements 3. Therefore, during the shaping operation of coil $C_{P1}$, which provides the multi-lobed coil $C_1$, fingers 8 constitute a further reference for the width of each lobe L of multi-lobed coil $C_1$.

As taught in the art, an inserting device 9 is provided under rotating unit 1 for receiving the multi-lobed coils after they have been formed and for inserting them (in a subsequent stage of operation not shown in the FIGS.) into the slots of a stator of an alternator. Inserting device 9 includes a circumferential set of twelve blades 10 separated by longitudinal slots 11 and carried by a supporting structure 12 which can be rotated around rotational axis 5 by an electric motor (not shown). The electric motor and the associated transmission for rotating unit 1 and inserting device 9 are not shown herein in detail because they are similar to what is known in the art.

For clarity, FIG. 1 shows inserting device 9 at a position axially spaced apart from rotating unit 1, whereas in practice it is positioned immediately vertically.

As already described, after forming polygonal coil $C_{P1}$, rotating unit 1 is stopped, and pushing members 6 are advanced to form the multi-lobed coil $C_1$ (FIG. 2). Multi-lobed coil $C_1$ is then discharged from rotating unit 1 over inserting device 9 by a coil removing device of conventional type carried by rotating unit 1 and adapted to be lowered axially from a retracted position to a position in which it engages the multi-lobed coil $C_1$ and pushes this coil downward making it slide from forming elements 3 and causing the radial portions of the coil to be inserted into slots 11, so that the lobes L and the hollows V between the lobes of the multi-lobed coil $C_1$ are located alternately at the outside and the inside of the circumferential set of blades 10, as shown in FIG. 1. In FIG. 1, the coil removing device is not shown, because it is in its raised position, retracted inside rotating unit 1. This coil removing device includes, as is known in the art, a circumferential set of blades 13 (see FIG. 2) extending downward from an upper ring, similar to what is shown in FIG. 1 for fingers 8. As a result of its lowering movement, the coil removing device starts with its base ring in engagement with the radial portions of multi-lobed coil $C_1$ and pushes this coil downward, causing it to slip out of forming elements 3 and into slots 11 of inserting device 9, as shown in FIG. 1.

In a conventional machine, either immediately before or immediately after discharging the multi-lobed coil $C_1$ on inserting device 9, the wire being fed is cut, so that the coil arranged on inserting device 9 has two terminal ends. Therefore, in a method known in the art, the rotating unit may be rotated again to provide a second multi-lobed coil which is then discharged onto inserting device 9 at an angularly shifted position, so as to obtain, for example, the two semi-phases of a phase of the winding, with a total of four terminal ends.

In contrast to the prior art and in accordance with the present invention, after the first multi-lobed coil $C_1$ has been discharged on inserting device 9, the wire being fed is not cut and the forming of a new polygonal coil is instead initiated by rotating unit 1 in a direction of rotation opposite to that of the previous forming stage, as shown in FIGS. 4 and 5. Specifically, in the forming stage shown in FIG. 2, the rotating unit is rotated in the direction indicated by arrow A in FIG. 2. In the forming stage shown in FIG. 5, the rotating unit is rotated in the opposite direction B, i.e., in a counterclockwise direction.

Naturally, because the wire portion which connects the previously formed multi-lobed coil $C_1$ (located on inserting device 9) to the polygonal coil $C_{P1}$ (which is being formed during the stage shown in FIG. 5, corresponding as well to the condition shown in FIG. 1) is not interrupted, inserting device 9 should also be rotated at the same speed as rotating unit 1 during the second forming stage, so that rotating unit 1 and inserting device 9 always remain at preferably the same relative positions. This is done preferably by controlling the electric motors that drive rotating unit 1 and inserting device 9 in synchronism with each other. Alternatively, a releasable mechanical coupling between rotating unit 1 and inserting device 9 may be provided, thereby allowing the same motor to be used to drive rotating unit 1 and inserting device 9. For example, the releasable connection may be provided by the coil removing device, which (in this embodiment) is able to engage inserting device 9 when in lowered position to connect this device to rotating unit 1.

An important feature of the present invention is that rotating unit 1 is angularly displaced so as to locate it at an angular position shifted by one lobe relative to the position of the first multi-lobed coil $C_1$ (which is in a stationary position on inserting device 9) before activating the forming stage of the second polygonal coil $C_{P1}$ by rotating in the opposite direction rotating unit 1 and simultaneously rotating inserting device 9. This condition is shown in FIG. 4, where the multi-lobed coil $C_1$ (which has been already discharged onto inserting device 9) is shown with dotted lines. Forming elements 3 and flat fingers 8 are at angular positions shifted by 30° relative to the first multi-lobed coil $C_1$, so that each forming element 3 is at an angular position corresponding to that of a hollow between adjacent lobes of the first multi-lobed coil $C_1$ already discharged onto inserting device 9.

A further feature which distinguishes the invention from the prior art is that on one of flat fingers 8 there is fixed a wire engaging element 14 (see FIGS. 1 and 4) which is carried by rotating unit 1 and is coupled thereto at a radially fixed position. Specifically, wire engaging element 14 is at a radial position corresponding to the radial position of the lobes of the coil. In particular, wire engaging element 14 has an outer profile substantially corresponding to the profile of a lobe. Furthermore, wire engaging element 14 is positioned such that after the previously formed first multi-lobed coil $C_1$ has been discharged onto inserting device 9, the wire portion $W_i$ connecting coil $C_1$ (positioned on inserting device 9) to the wire feeding delivery tube outlet mouth 2 is intercepted by wire engaging element 14 when rotating unit 1 is rotated in a counterclockwise direction (with reference to FIG. 5) in order to form a second coil.

Therefore, the wire portion connecting the first multi-lobed coil $C_1$ to the polygonal coil $C_P$ being formed is intercepted by wire engaging element 14 during the formation of the second polygonal coil $C_{P2}$, as shown in FIGS. 1, 4, and 5. Referring to FIG. 1, note that for clarity inserting device 9 is shown in a condition spaced axially from rotating unit 1. Actually, the inserting device is located immediately below the rotating unit, so that the intermediate wire portion $W_i$ has a length much smaller than that shown in this FIG. As shown in FIGS. 7 and 8, the first multi-lobed coil $C_1$ has a starting terminal end 15 and a final terminal end 16 projecting from a hollow $V_f$ of multi-lobed coil $C_1$. Terminal end 16 extends radially and is curved into a portion 17 (FIGS. 7 and 8) as a result of wire W being intercepted by wire engaging element 14 after rotating unit 1 starts rotating in the opposite direction (see FIGS. 1 and 5).

When the second polygonal coil $C_{P2}$ has been formed (FIGS. 1 and 5), rotating unit 1 is again stopped and pushing members 6 are again driven to push against the sides of polygonal coil $C_{P2}$, thereby transforming the latter into a second multi-lobed coil $C_2$. In this stage, wire portion $W_i$ projecting from wire engaging element 14 is intercepted by one of pushing members 6a (FIG. 5), causing it to bend into a portion 18 (FIGS. 7 and 8) directed radially inward. Therefore, with reference to FIGS. 7 and 8, wire portion $W_i$ connecting first multi-lobed coil $C_1$ to the second multi-lobed coil $C_2$ (which is angularly offset by one lobe relative to coil $C_1$) is bent to form a loop E (FIGS. 8 and 9) where the wire reverses its winding direction, with a portion following the profile of hollow $V_f$ of coil $C_1$ and a portion following the profile of a lobe $L_i$ of the multi-lobed coil $C_2$. This means that the two multi-lobed coils $C_1$ and $C_2$ are obtained without cutting the wire and without the intermediate wire portion $W_i$ having redundant (e.g., excess or protruding) portions which might cause difficulties during the following stage of inserting the winding into slots of a stator. The winding obtained thereby has a single starting end 15 and a single final end 19. As indicated above, it should be noted that, intermediate wire portion $W_i$ has been shown in a deformed condition in FIG. 7, with the two coils $C_1$ and $C_2$ axially spaced apart from each other, in order to show clearly the loop configuration. Actually, in the finished winding, the two multi-lobed coils $C_1$ and $C_2$ are located immediately above each other with the intermediate loop portion $W_i$ lying substantially in a plane (FIG. 8).

Following the formation of second multi-lobed coil $C_2$, the latter is naturally discharged onto inserting device 9 by blades 13 of the coil removing device, similar to first coil $C_1$.

Accordingly, the winding obtained and discharged onto inserting device 9 has two semi-phase coils $C_1$ and $C_2$ angularly shifted relative to each other by one lobe, which are obtained without interrupting the wire and with two single terminal ends 15 and 19.

As is known in the art, once inserting device 9 has received the finished winding, it is positioned at an inserting station, where a stator is preliminarily arranged for insertion of the winding. Typically, this is done in a machine with a rotating platform, carrying two inserting devices 9 which are located at diametrically opposite positions so that they can be brought alternatively, by a 180° rotation of the rotating platform, at the two diametrically opposite stations, one of which is for forming the winding and discharging the winding onto the inserting device, and the other is for inserting the winding into a stator. Therefore, an inserting device receives a new winding at the forming station, while at the diametrically opposite station, another inserting device carrying a previously formed winding has that winding inserted into a stator. When this operation is completed, the rotating structure is rotated by 180°, so the inserting device which had previously had a winding inserted into a stator is now at the forming station, where it will receive a new winding, while the inserting device which had previously received a new winding now has that winding inserted into the same or another stator. Additional details of this operation are not shown or described because, as previously indicated, they are known in the art.

Figure 9:
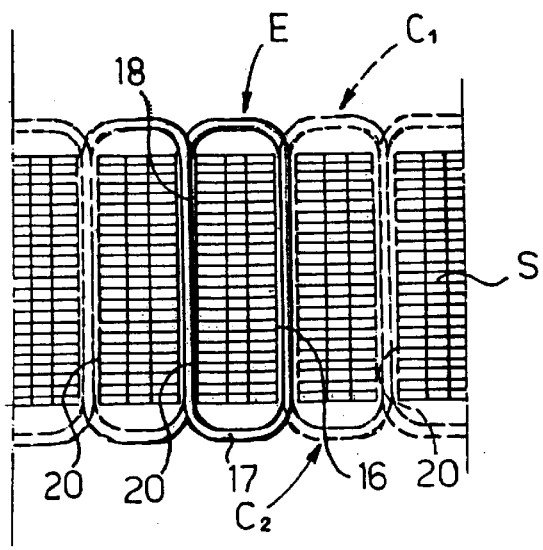
FIG. 9 is a diagrammatic view of a winding obtained by the invention inserted into the slots of a stator of an alternator.

FIG. 9 is a diagrammatic partial view of the inner cylindrical surface of a stator S having axial slots 20 for receiving radial portions of the multi-lobed coils constituting the winding. In this FIG., as in FIG. 8, the winding is shown in dotted lines, except for the wire portion forming loop E where the wire reverses its winding direction. As shown in FIG. 8, loop E follows an annular path that for one portion overlaps one lobe of a coil and for another portion overlaps a hollow of the other coil opposite the one lobe. Accordingly, during insertion of the winding into stator S, loop E should cause no problems because its portions 16 and 18 are preferably aligned with and easily received into two slots 20 of stator S (FIG. 9).

In the embodiment disclosed in FIGS. 1–9, the rotating unit includes a wire engaging element situated at a fixed position on the rotating unit. The position is chosen such that the wire engaging element intercepts the feeding wire when the rotation of the unit is reversed in order to form the loop.

Another preferred embodiment of the present invention provides an apparatus having all the features indicated above, including wire engaging element 14. However, wire engaging element 14 is not located at a fixed position on rotating unit 1, but is connected instead to one of forming elements 3 with which the rotating unit is provided. That forming element is movable in a radial direction relative to the rotating unit.

Tests have shown that by providing the wire engaging element on one of the forming elements, which are radially movable relative to the rotating unit and displaced towards the axis of rotation of the rotating unit to give a star-like shape to the initially polygonal coil during the winding operation, obtaining a winding of a high quality is ensured, particularly at the loop, where the wire reverses its winding direction.

In particular, tests have shown that the invention creates a loop with an appropriate circumferential extension—that is, a loop with neither with an excessively abundant length (which might disturb the subsequent insertion of the winding into slots of a stator), nor with an excessively short length (which might result in an undesired tension on the wire in a subsequent winding operation).

A second preferred embodiment of apparatus is shown in FIGS. 10–12 in accordance with the present invention. FIGS. 10, 11, and 12 are respectively identical, except for features which will be described below, to FIGS. 1, 4, and 5. Accordingly, a detailed description thereof will not be repeated herein. Described below are the differences between the second embodiment and the first embodiment shown in FIGS. 1–9.

FIG. 10 differs from FIG. 1 in that wire engaging element 14 (on which loop E is formed when the wire reverses its winding direction) includes a plate screwed to the radial inner surface of one of forming elements 3, rather than being fixed to one of fixed blades 8 carried by rotating unit 1. This feature can also be seen in FIGS. 11 and 12, which are similar, as indicated, to FIGS. 4 and 5. FIGS. 11 and 12 respectively show the apparatus diagrammatically in a plan view after winding a first coil and after the beginning of the winding in the opposite direction of a second coil. As already discussed, apart from this difference, the structure and operation of the apparatus are similar to that described in connection with FIGS. 1–9.

Referring now to FIGS. 13 and 14, the operation of wire engaging element 14 is described with greater particularity. FIG. 13 is a partial diagrammatic plan view of the apparatus. Note that for clarity, forming element 3 and wire engaging element 14 are shown radially closer to the center of rotating unit 1 then they would be in actual practice. FIG. 14 is a partial view of the apparatus of FIG. 13 seen along A—A, but at a different stage of the forming operation of the multi-lobed winding.

As shown in FIG. 13, first multi-lobed coil $C_1$ has been inserted on blades 10 of inserting device 9 with the wire lead $W_2$ extending to wire delivery tube 2 at angular position $\alpha$. When first multi-lobed coil $C_1$ is deposited on inserting device 9, forming element 3 and wire engaging element 14 (wire engaging element 14 is connected to one of forming elements 3, as shown in FIGS. 13 and 14) are in position P. Position P corresponds to the lobe of first multi-lobed coil $C_1$ immediately to the right of delivery tube 2, as shown in FIG. 13. During the deposit of first multi-lobed coil $C_1$ on the inserting device 9, rotating unit 1 is lowered and delivery tube 2 reaches its lowest level $h_1$ (as shown in FIG. 14). Lowering rotating unit 1 facilitates deposit while lowering delivery tube 2 prevents wire lead $W_2$ from becoming too long.

After the deposit of first multi-lobed coil $C_1$ on the inserting device 9, rotating unit 1 and delivery tube 2 are raised (to prevent wire engaging element 14 from catching wire lead $W_2$) and rotated in direction D such that forming element 3 and wire engaging element 14 are at angular position $\beta$. As shown in FIG. 14, the tip of wire engaging element 14 preferably slopes downward (in direction D) to further decrease the chance of wire engaging element 14 catching wire lead $W_2$ during the rotation to angular position $\beta$ in direction D. Once at angular position $\beta$, rotating unit 1 and delivery tube 2 are lowered toward the inserting device 9 and rotated in direction $D_1$ until wire engaging element 14 engages wire lead $W_2$.

After wire engaging element 14 engages wire lead $W_2$, rotating unit 1 and the inserting device 9 start to rotate in synchronism in direction $D_1$ to form the second polygonal coil $C_{P2}$. At about this time (i.e., about when the synchronized rotation starts), rotating unit 1 rises away from the inserting device 9. The delivery tube 2 must also rise (to level $h_2$, as shown in FIG. 14) in order to cause the wire of the second polygonal coil $C_{P2}$ to engage forming elements 3 (which are higher than wire engaging element 14).

Tests show that because of the above difference, the apparatus according to the second embodiment provides a winding in which the loop formed at the location where the wire reverses its winding direction has a circumferential extension which substantially corresponds to the desired theoretical one, or at most slightly greater (to avoid any inconvenience during both the forming operation of the coil and the following inserting operation of the winding into slots of a stator of an alternator).

Merely by way of example, FIG. 10 shows the application of the apparatus to the case in which two wires are simultaneously wound on rotating unit 1. This technique, known in the art, provides a wire feeding delivery tube 2 to which two separate wires W are fed from separate supply reels. The wires W reach the rotating unit by passing through two separate holes 2a and 2b (FIG. 11) of delivery tube 2, which keep wires W spaced apart from each other by a given distance. Naturally, the apparatus according to the present invention may alternatively be used with a feeding device which feeds a single wire.

The invention is applicable both to the case in which a single wire is wound on the rotating unit, and to the case, corresponding to a known technique, in which two wires are simultaneously fed to and wound on the rotating unit, as shown in FIG. 10, for example.

Naturally, while the principles of the invention remains the same, the details of construction and the embodiments may vary widely with respect to what has been described and illustrated, without departing from the scope of the present invention.

In particular, the invention has been applied to a machine of the type shown in Italian Patent No. 1,157,040, and in corresponding U.S. Pat. No. 4,512,376, merely by way of example. Moreover, even though machines of types different from that described in these patents are also currently being used to form undulatory coils, the present invention is equally applicable to those types as well. One skilled in the art will therefore appreciate that the present invention can be practiced by other than the described embodiments, which are presented for purposes of illustration and not of limitation, and that the present invention is limited only by the claims which follow.

I claim:

1. Apparatus that forms a multi-lobed electrical winding having a plurality of radial lobes alternated with hollows, said apparatus comprising:
   a rotating unit that winds a wire clockwise to form a first polygonal coil and winds said wire counterclockwise without cutting said wire to form a second polygonal coil, said rotating unit comprising a wire engaging element that intercepts said wire to form a loop when rotation of said rotating unit is reversed; and
   pushing members operative to push sides of each said polygonal coil radially inward to form said multi-lobed winding; wherein:
      said second coil of said multi-lobed winding is axially superimposed on and angularly shifted relative to said first coil of said multi-lobed winding, and
      said loop follows an annular path matching a profile of said first coil for one part and a profile of said second coil for another part.

2. The apparatus of claim 1 wherein said wire engaging element is stationary while said rotating unit rotates.

3. The apparatus of claim 1 wherein said wire engaging element is radially movable relative to said rotating unit.

4. The apparatus of claim 1 wherein said wire engaging element has a profile substantially corresponding to a profile of one of said lobes.

5. The apparatus of claim 1 wherein said multi-lobed winding has a plurality of lobe-hollow positions, each said lobe-hollow position comprising a lobe of one of said first and second axially superimposed coils and a corresponding hollow of the other of said first and second axially superimposed coils, said multi-lobed winding having a start lead and a final lead positioned together at a same lobe-hollow position, said start lead and said final lead positionable by said apparatus at each of a plurality of said lobe-hollow positions.

6. The apparatus of claim 1 wherein said multi-lobed winding has a plurality of lobe-hollow positions, each said lobe-hollow position comprising a lobe of one of said first and second axially superimposed coils and a corresponding hollow of the other of said first and second axially superimposed coils, said multi-lobed winding having a start lead and a final lead positioned together at a same lobe-hollow position, said same lobe-hollow position adjacent a lobe-hollow position that includes said loop.

7. Apparatus operative to form a multi-lobed electrical winding, said winding having a plurality of radial lobes alternated with hollows, said apparatus comprising:
   a rotating unit operative to wind a continuous wire in one rotational direction for a first number of turns of wire and then in the opposite rotational direction for a second number of turns of wire without cutting said wire between said first and second numbers of turns of wire;
   at least two forming elements around which said wire is wound by said rotating unit;
   a pushing member operative to push said wire radially inward between said two forming elements to form a hollow and two partial lobes; and
   a receiving tool arranged coaxially with said rotating unit to receive said first and second numbers of turns of wire, said first and second numbers of turns of wire each having a plurality of alternating hollows and lobes and having a wire portion connecting said first number of turns of wire with said second number of turns of wire, said wire portion following an annular path matching the profile of one lobe of said first number of turns of wire for one part and the profile of a hollow of said second number of turns of wire for another part.

8. The apparatus of claim 7 wherein one of said two forming elements is operative to form said annular path of said wire portion.

9. The apparatus of claim 7 wherein a turn of wire comprises one substantially complete 360° revolution of wire.

10. The apparatus of claim 7 wherein said first and second numbers of turns of wire are substantially equal.

11. Apparatus operative to form a multi-lobed electrical winding, said winding having a plurality of radial lobes alternated with hollows, said apparatus comprising:
   a rotating unit operative to wind a continuous wire in one rotational direction for at least one turn and then in the opposite rotational direction for at least one turn without cutting said wire;
   at least two forming elements around which said wire is wound by said rotating unit, one of said forming elements operative to form a loop with said wire when said rotating unit reverses rotational direction;

at least one pushing member operative to push said wire radially inward between said two forming elements to form a hollow and two partial lobes; and a receiving tool arranged coaxially with said rotating unit to receive a wound wire after said wound wire has had a plurality of hollows and lobes formed therein, said loop following an annular path matching the profile of one lobe of said wires wound in said one rotational direction for one part and the profile of a hollow of said wire wound in said opposite rotational direction for another part.

12. Apparatus for forming a multi-lobed electrical winding, said winding comprising turns defining a star-shaped configuration and having a plurality of radial lobes alternated with hollows, said apparatus comprising:

a rotating unit that winds a wire to form a first polygonal coil;

pushing members radially movable with respect to the axis of rotation of said rotating unit and operative to push the central portions of the sides of said first coil radially inward to form said multi-lobed winding;

a receiving tool arranged coaxially with said rotating unit on which said multi-lobed winding is discharged;

means for forming a second polygonal multi-lobed coil axially superimposed on said first coil without cutting said wire, said wire forming a portion connecting said first and second coils, said means winding said wire to form said second coil in the opposite direction as said first coil;

means for arranging said second coil at a position angularly shifted relative to said first coil such that said second coil has its lobes at the same angular positions as the hollows of said first coil; and means for bending said wire portion to form a loop following an annular path matching the profile of one lobe of one of said first and second coils for one part and the profile of a hollow of the other of said first and second coils opposite said one lobe for another part.

13. A method of forming a multi-lobed electrical winding, said winding having a plurality of radial lobes alternated with hollows, said method comprising:

forming a first polygonal coil with a rotating unit;

pushing sides of said first polygonal coil radially inward to form a first semi-phase of said multi-lobed winding;

forming a second semi-phase of said multi-lobed winding axially superimposed on and angularly shifted relative to said first semi-phase, said first and second semi-phases formed with a same wire, said wire uncut between said first and second semi-phases; and bending said uncut wire between said first and second semi-phases to form a loop following an annular path matching a profile of said first semi-phase for one part and a profile of said second semi-phase for another part.

14. The method of claim 13 further comprising positioning start and final leads of said multi-lobed winding at any one of said lobes.

15. The method of claim 13 further comprising positioning start and final leads of said multi-lobed winding at one of said lobes adjacent the one of said lobes having said loop.

16. A method of forming a multi-lobed electrical winding, said winding having a plurality of radial lobes alternated with hollows, said method comprising:

forming a polygonal coil having at least one turn with a rotating unit;

pushing each side of said polygonal coil radially inward to form said multi-lobed winding;

discharging said multi-lobed winding on a receiving tool;

forming a second polygonal coil having at least one turn with said rotating unit rotating in a direction opposite said forming of said first polygonal coil without cutting the wire between said first and second coils; and bending said wire where said wire reverses its winding direction to form a loop following an annular path matching the profile of one of said first and second coils for one part and the profile of the other of said first and second coils for another part.

17. A method of forming a multi-lobed electrical winding, said winding having a plurality of radial lobes alternated with hollows, said method comprising:

winding a continuously fed wire in a first direction to form a first coil;

winding said wire in a direction opposite said first direction without cutting said wire to form a second coil; and arranging said second coil at a position angularly shifted relative to said first coil such that the lobes of one said coil are at the same angular positions as the hollows of the other said coil, a wire portion connecting said first and second coils forming a loop where said wire reverses its winding direction, said loop following an annular path matching the profile of a lobe of one of said coils for one part and the profile of a hollow of the other one of said coils for another part.

18. A method of forming a multi-lobed electrical winding, said winding having a plurality of radial lobes alternated with hollows, said method comprising:

winding a wire in a first direction to form a first coil having radial lobes alternated with hollows;

winding said wire in a direction opposite said first direction without cutting said wire to form a second coil having radial lobes alternated with hollows, said wire having a portion connecting said first and second coils;

forming said wire portion into a loop following an annular path matching the profile of a lobe of one of said coils for one part and the profile of a hollow of the other one of said coils for another part; and arranging said second coil axially superimposed on said first coil at a position angularly shifted relative to said first coil such that the lobes of one said coil are at the same angular positions as the hollows of the other said coil.

19. A method of forming a multi-lobed electrical winding, said winding comprising turns defining a star-shaped configuration and having a plurality of radial lobes alternated with hollows, said method comprising:

forming a polygonal coil beginning at a starting point with a rotating unit being fed a wire;

pushing the central portions of each side of said polygonal coil radially inward to form a multi-lobed coil of said winding;

discharging said multi-lobed coil on a receiving tool which is arranged coaxially with said rotating unit;

forming a second multi-lobed coil axially superimposed on said first coil, without cutting said wire being fed, by winding said wire beginning at a hollow offset by one lobe relative to said starting point in the opposite direction as said forming said first coil; and arranging said second coil at a position angularly shifted relative to said first coil such that said second coil has its lobes at the same angular positions as the hollows of said first coil, a wire portion connecting said first and second coils being bent where said wire reverses its winding direction so as to form a loop following an annular path matching the profile of one lobe of one of said first and second coils for one part and the profile of a hollow of the other of said first and second coils opposite said one lobe for another part.

20. A method for forming a multi-lobed electrical winding, said winding comprising turns defining a star-shaped configuration and having a plurality of radial lobes alternated with hollows, said method comprising:

forming a polygonal coil having at least one turn of wire with a rotating unit;

pushing the central portions of each side of said polygonal coil radially inward to form a multi-lobed coil of said winding;

discharging said multi-lobed coil on a receiving tool which is arranged coaxially with said rotating unit;

forming a second multi-lobed coil having at least one turn of wire axially superimposed on said first coil, without cutting the wire being fed, by winding said wire in the opposite direction; and arranging said second coil at a position angularly shifted relative to said first coil, so that said second coil has its lobes at the same angular positions as the hollows of said first coil, the wire portion connecting said two coils being bent where the wire reverses its winding direction, so as to form a loop following an annular path matching the profile of one lobe of one of said two coils for one part and the profile of a hollow of the other said two coils opposite to said one lobe for another part.

21. Apparatus for forming a multi-lobed electrical winding, said winding having a plurality of radial lobes alternated with hollows, said apparatus comprising:

means for forming a first polygonal coil with a rotating unit;

means for pushing sides of said first polygonal coil radially inward to form a first semi-phase of said multi-lobed winding;

means for forming a second semi-phase of said multi-lobed winding axially superimposed on and angularly shifted relative to said first semi-phase, said first and second semi-phases formed with a same wire, said wire uncut between said first and second semi-phases; and means for bending said uncut wire between said first and second semi-phases to form a loop following an annular path matching a profile of said first semi-phase for one part and a profile of said second semi-phase for another part.

22. Apparatus for forming a multi-lobed electrical winding, said winding having a plurality of radial lobes alternated with hollows, said apparatus comprising:

means for forming a polygonal coil having at least one turn with a rotating unit;

means for pushing each side of said polygonal coil radially inward to form said multi-lobed winding;

means for discharging said multi-lobed winding on a receiving tool;

means for forming a second polygonal coil having at least one turn with said rotating unit rotating in a direction opposite said forming of said first polygonal coil without cutting the wire between said first and second coils; and means for bending said wire where said wire reverses its winding direction to form a loop following an annular path matching the profile of one of said first and second coils for one part and the profile of the other of said first and second coils for another part.

23. Apparatus for forming a multi-lobed electrical winding, said winding having a plurality of radial lobes alternated with hollows, said apparatus comprising:

means for winding a continuously fed wire in a first direction to form a first coil;

means for winding said wire in a direction opposite said first direction without cutting said wire to form a second coil; and means for arranging said second coil at a position angularly shifted relative to said first coil such that the lobes of one said coil are at the same angular positions as the hollows of the other said coil, a wire portion connecting said first and second coils forming a loop where said wire reverses its winding direction, said loop following an annular path matching the profile of a lobe of one of said coils for one part and the profile of a hollow of the other one of said coils for another part.

24. Apparatus that forms a multi-lobed winding, said winding having a plurality of radial lobes alternated with hollows, the apparatus comprising:

a rotating unit that winds a wire clockwise to form a first polygonal coil and winds said wire counterclockwise without cutting said wire to form a second polygonal coil, said rotating unit comprising a wire engaging element that intercepts said wire to form a loop when rotation of said rotating unit is reversed; and pushing members carried by the rotating unit to push sides of each said polygonal coil radially inward to form said multi-lobed winding; wherein:

said second coil of said multi-lobed winding is axially superimposed on and angularly shifted relative to said first coil of said multi-lobed winding, and said loop follows an annular path matching a profile of said first coil for one part and a profile of said second coil for another part.

25. The apparatus of claim 24 wherein said wire engaging element is stationary while said rotating unit rotates.

26. The apparatus of claim 24 wherein said wire engaging element is radially movable relative to said rotating unit.

27. The apparatus of claim 26 wherein said rotating unit further comprises a plurality of forming elements around which polygonal coils are formed while said rotating unit rotates, said forming elements radially movable relative to said rotating unit, said wire engaging element connected to one of said forming elements.

28. The apparatus of claim 24 wherein said wire engaging element has a profile substantially corresponding to a profile of one of said lobes.

29. The apparatus of claim 24 wherein said multi-lobed winding has a plurality of lobe-hollow positions, each said lobe-hollow position comprising a lobe of one of said first and second axially superimposed coils and a corresponding hollow of another of said first and second axially superimposed coils, said multi-lobed winding having a start lead and a final lead positioned together at a same one of said lobe-hollow positions, said start lead and said final lead positionable by said apparatus at each of a plurality of said lobe-hollow positions.

30. The apparatus of claim 24 wherein said multi-lobed winding has a plurality of lobe-hollow positions, each said lobe-hollow position comprising a lobe of one of said first and second axially superimposed coils and a corresponding hollow of another of said first and second axially superimposed coils, said multi-lobed winding having a start lead and a final lead positioned together at a same one of said lobe-hollow positions, said same one lobe-hollow position adjacent a lobe-hollow position that includes said loop.

31. A method of forming a multi-lobed winding, said winding having a plurality of radial lobes alternated with hollows, said method comprising:

forming a first polygonal coil with a rotating unit;

pushing sides of said first polygonal coil radially inward to form a first semi-phase of said multi-lobed winding;

forming a second semi-phase of said multi-lobed winding axially superimposed on and angularly shifted relative to said first semi-phase, said first and second semi-phases formed with a same uncut wire between said first and second semi-phases; and bending said uncut wire between said first and second semi-phases to form a loop following an annular path matching a profile of said first semi-phase for one part and a profile of said second semi-phase for another part.

32. The method of claim 31 further comprising positioning start and final leads of said multi-lobed winding at any one of said lobes alternated with hollows.

33. The method of claim 31 further comprising positioning start and final leads of said multi-lobed winding at one of said lobes alternated with hollows that is adjacent another one of said lobes alternated with hollows that includes said loop.

* * * * *